United States Patent [19]

Cowen et al.

[11] Patent Number: 4,469,399
[45] Date of Patent: Sep. 4, 1984

[54] METHOD OF MAKING AN UNDERSEA, HIGH PRESSURE BULKHEAD PENETRATOR FOR USE WITH FIBER OPTIC CABLES

[75] Inventors: Steven J. Cowen; James H. Daughtry; Christopher M. Young, all of San Diego; John T. Redfern, La Jolla, all of Calif.

[73] Assignee: The United States of America as represented by the Secretary of the Navy, Washington, D.C.

[21] Appl. No.: 335,903

[22] Filed: Dec. 30, 1981

[51] Int. Cl.³ .............................................. G02B 7/26
[52] U.S. Cl. .................................. 350/96.20; 350/320
[58] Field of Search ............................ 174/70 R, 70 S; 350/96.20, 96.21, 96.22, 320

[56] References Cited

U.S. PATENT DOCUMENTS

| | | | |
|---|---|---|---|
| 3,813,514 | 5/1974 | Canty | 219/354 |
| 3,825,320 | 7/1974 | Redfern | 350/96.22 |
| 3,928,102 | 12/1975 | Rowe et al. | 156/158 |
| 4,164,363 | 8/1979 | Hsu | 350/96.17 |
| 4,172,212 | 10/1979 | Heinzer | 174/50 |
| 4,214,809 | 7/1980 | Reh | 350/96.20 |
| 4,222,629 | 9/1980 | Dassele et al. | 350/96.20 |
| 4,296,996 | 10/1981 | Niiro et al. | 350/96.20 |
| 4,345,816 | 8/1982 | Nakai et al. | 350/96.20 |

Primary Examiner—John D. Lee
Assistant Examiner—Frank González
Attorney, Agent, or Firm—Robert F. Beers; Ervin F. Johnston; Thomas Glenn Keough

[57] ABSTRACT

A high pressure penetrator for use with fiber optic cables is fabricated by a method which assures reliable operation. The method of fabrication first calls for providing a bore through the pressure wall of a container of instrumentation. Applying wax to one end of a cylindrically-shaped lens prepares it for alignment in the bore. A suitable lens is the one-half pitch graded refractive index lens of the type marketed under the trademark, SELFOC. The cylindrically-shaped lens is inserted into the bore to locate its far end flush with one side of the wall and so that the wax applied end of the lens lies within the bore at the wall's opposite side. Melting the wax allows it to flow around the tip of the wax applied end of the lens and a subsequent cooling of the melted wax precisely fixes the cylindrically-shaped lens into position within the bore. A high strength epoxy resin is potted in the clearance space between the lens and the bore by vacuum drawing the resin into the clearing space so that, upon curing the resin, the lens will be securely held in place to permit an optical aligning of fibers on either end of the lens to assure optical signal transfer.

7 Claims, 6 Drawing Figures

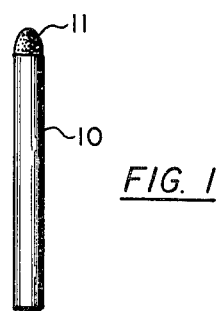
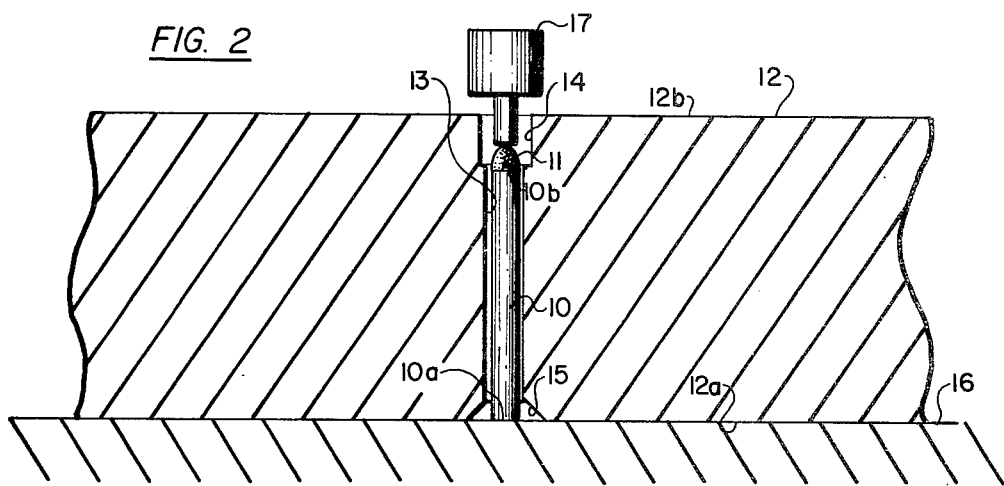
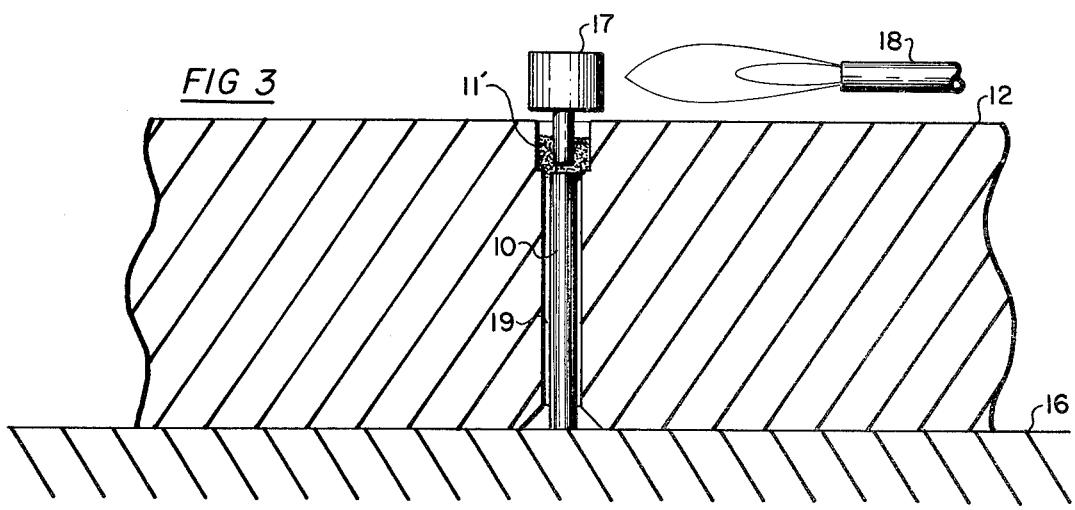

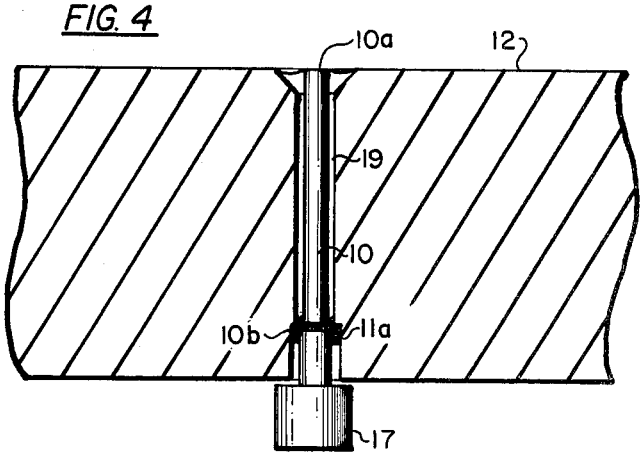
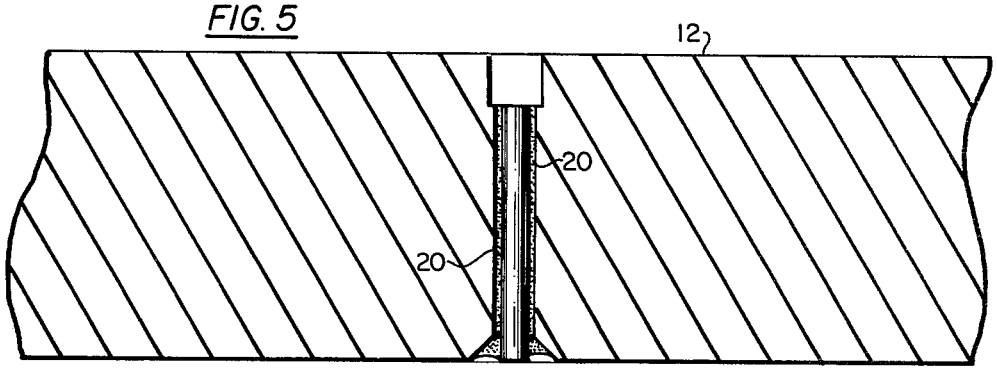
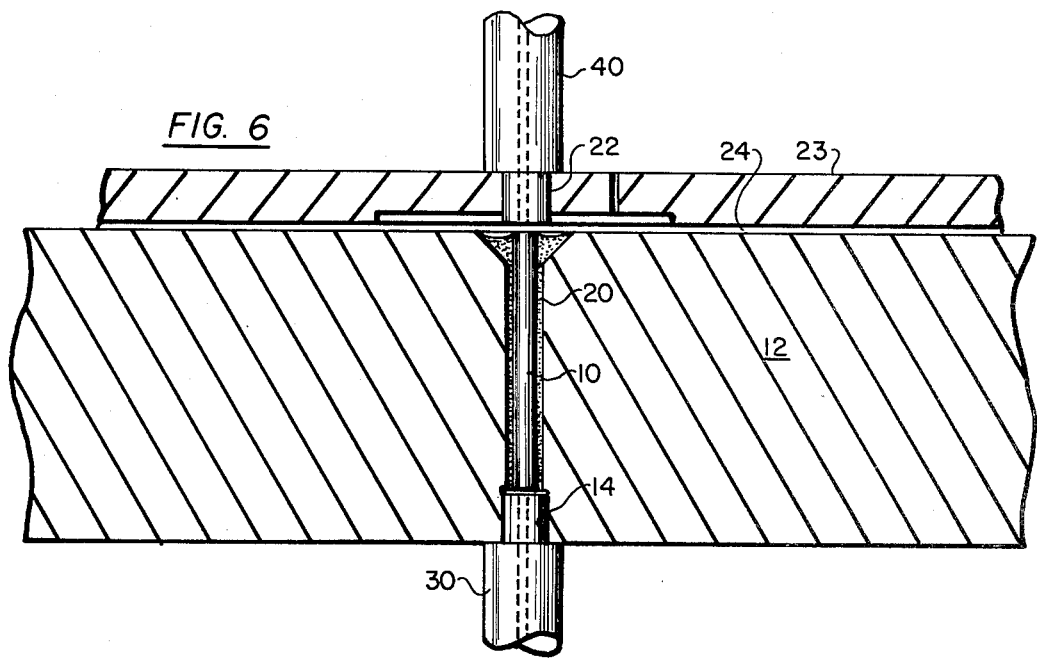

METHOD OF MAKING AN UNDERSEA, HIGH PRESSURE BULKHEAD PENETRATOR FOR USE WITH FIBER OPTIC CABLES

STATEMENT OF GOVERNMENT INTEREST

The invention described herein may be manufactured and used by or for the Government of the United States of America for governmental purposes without the payment of any royalties thereon or therefor.

REFERENCE TO RELATED APPLICATION

This application is related to a patent application pending in the U.S. Patent and Trademark Office, Ser. No. 322,808 by Steven J. Cowen and entitiled Hermetic High Pressure Fiber Optic Bulkhead Penetrator.

BACKGROUND OF THE INVENTION

The optical transmission of information through high pressure mediums has increased greatly. Undersea instrumentation and submersibles have more optical information transfer capabilities, partially due to the proven advantages of transmitting by light through fiber optics. The fiber optics, in addition to their well known data transmission capabilities, have certain advantages which make them attractive for penetrating a high pressure hull. One advantage is that their small size reduces the problems normally associated with pressure hull penetrations otherwise made by bulky metal conductors.

One design which recognizes the advantages of employing an optical penetrator is disclosed by John T. Redfern in his U.S. Pat. No. 3,825,320 entitled High-Pressure Optical Bulkhead Penetrator. A cylindrical or tapered plug of glass or cylindrical or tapered bundle of fiber optics is bonded within an accommodatingly shaped bore in a bushing. However, because O-rings and resin adhesives were included and the location of the plugs and bundles within the bores were not precisely made, it might be difficult to reliably fabricate a hermetical seal along the penetration. Experiences have demonstrated that adhesive boundaries may not be hermetic when quality assurances of a uniform bonding are not guaranteed. Most epoxies and polymers permit the passage of vapor over a period of time under the extreme pressure differentials encountered in deep ocean applications. In some penetrators, creep of the adhesive due to nonuniformity may create leaks. In addition, the smallness of the dimension of the ferrules inserted into the Redfern penetrator may affect alignment of the fibers and compromise the data transfer capability of the penetrator.

The Fiber Optic Connector Assembly of Michael A. Dassele et al., disclosed in U.S. Pat. No. 4,222,629 provides a hermetically sealed coupler. However, glass frit bonding fuses the whole arrangement together so that failure of anything from the fiber to the electrooptic conversion element requires that the whole assembly be discarded. If a different electrooptic function is desired, the whole unit must be replaced.

Thus, there is a continuing need in the state-of-the-art for a method of fabricating a penetrator capable of optically transmitting information through a high pressure differential wall that assures reliable long-term operation.

Summary of the Invention

The present invention is directed to providing a method for making a penetrator capable of optically transmitting through a wall separating a first medium from a higher pressure medium. First, there is a providing of a uniform bore through the wall and the applying of wax to one end of a cylindrically-shaped lens such as a one-half pitch graded refractive index lens. The inserting of the cylindrically-shaped lens into the bore locates its far end flush with one side of the wall and the wax-applied end within the bore at the opposite side of the wall. By resting the one wall and the far end of the cylindrically-shaped lens on a surface plate, the lens will automatically index its far end flush with the one side of the wall. Melting the wax allows it to flow around the tip of the wax applied end of the cylindrically-shaped lens so that upon cooling the melted wax precisely fixes the cylindrically-shaped lens into position within the bore and the wax does not run into a clearance space which exists between the lens and the bore. Potting a high strength epoxy resin into the clearance space and vacuum drawing it into the clearance space allows a curing of the resin to secure the rod in a water-tight and gas-tight sealed relationship so that a subsequent aligning of optical fibers on either side of the lens assures a reliable optical signal transfer.

It is a prime object of this invention to provide an improvement for a penetrator capable of withstanding a high pressure differential.

Another object is to provide a high pressure differential penetrator capable of transmitting optical information.

Still another object is to provide an optical information penetrator employing a precisely positioned cylindrically-shaped lens to enable its reliable potting in place.

Still another object is to provide a method for fabricating a high pressure differential penetrator relying upon an applied wax to hold a cylindrically-shaped lens in position.

Still another object is to provide a high pressure differential optical penetrator relying upon a vacuum potted resin uniformly disposed about a cylindrically-shaped lens for assuring greater reliability.

Still another object is to provide for a method for fabricating a high pressure differential optical penetrator assuring the uniform coating of a resin upon a cylindrically-shaped lens by reason of using meltable wax to secure the lens in place prior to potting and curing.

These and other objects of the invention will become more readily apparent from the ensuing description when taken with the appended drawings.

BRIEF DESCRIPTION OF THE DRAWINGS

FIG. 1 depicts a one-half pitch graded refractive index lens having wax applied at one end.

FIG. 2 is a cross-sectional representation of the positioning of the wax applied lens into the bore with its far end flush with the exposed surface of the wall.

FIG. 3 shows the melting of the applied wax by subjecting a tool to an external heat source.

FIG. 4 shows the cooled wax precisely fixing the cylindrically-shaped lens into position within the bore.

FIG. 5 shows the clearance space between the cylindrically-shaped lens and the bore sealed with high-strength epoxy resin and the melted wax removed.

FIG. 6 shows the optical alignment of fibers with the cylindrically-shaped lens.

DESCRIPTION OF THE PREFERRED EMBODIMENT

Referring now to the drawings, and in particular to FIG. 1, the method of this inventive concept relies on an essentially cylindrically-shaped lens 10 for functioning as an optical window across a high pressure differential. A relatively recent development is the graded refractive index rod lens (GRIN) such as the Selfoc device manufactured by the Nippon Sheet Glass Corporation. The lenses marketed by NSG under the trademark Selfoc are fabricated to provide a number of characteristics, one of which is the one-half pitch length which can serve as a combination pressure barrier and relay lens. This lens or imaging rod has the property of transferring light emanating from an object placed near one surface to an inverted image on the opposite surface. The lens is available in a variety of sizes which can accommodate different connectors for single fiber or bundles of fibers. As a first step in the method of this invention, a sealing wax 11 is applied to one end of the lens. The manner of application can be melting or otherwise suitably affixing a suitable meltable wax to the rod.

Looking to FIG. 2, a high pressure differential barrier 12 is provided with a bore 13 for receiving the SELFOC lens. The wall functions to withstand the crushing ambient pressure found in extreme ocean depths to protect an instrumentation package interior which is usually at atmospheric pressure. Stainless steel as the barrier wall material has been found to be an acceptable choice since, it is not only tough and workable, but also resists corrosive seawater.

A cylindrical recess 14 is also bored in the wall in an aligned relationship with the bore and an annular recess 15 is machined in the wall at the opposite end of the bore. The cylindrical recess is provided to aid in aligning the lens and to accommodate an optical connector to be referred to below.

The SELFOC lens 10 is inserted in the bore so that its far end 10a rests flush on a surface plate 16 surface 12a of the wall also rests flush along with end 10a coplanar relationship. The bore has a dimension to accommodate the full length of the lens along with the alignment tip length of a fiber optic connector and the fiber optic connector to rod face clearance dimension.

A copper tool 17 is brought within cavity 14 to rest on the axial extension of applied wax 11. A heat source 18 is brought next to the tool and enough heat is conducted to melt the wax. The melted wax forms an airtight seal 11' which precisely fixes SELFOC lens 10 into position, see FIG. 3.

Because the stainless steel of wall 12 is a relatively poor heat conductor, melted wax 11' does not flow into a clearance space 19 between the interior surface of bore 13 and the side surface of lens 10. The lower surface of the far end 10a of the rod is automatically indexed flush with surface 12a of wall 12 by virtue of its coplanar resting contact on surface plate 16. Because of the choice of wall thickness and the length of lens 10, proper clearance is maintained between the upper rod surface 10b and the upper face 12b of the penetrator body, see FIG. 4 showing the hardened wax maintaining the proper positioning.

Rod body clearance space 19 is filled with a high strength epoxy resin using standard potting techniques. A typical resin suitable for this application is commercially available under the designation Epotek Type 301. The wax seal 11' permits the required suction to draw the resin into clearance space 19. When atmospheric pressure is applied to the assembly after vacuum filling, the resin is retained in the clearance space and it cures. Removal of the copper tool 17 allows the ultrasonic cleaning away of wax 11' by a suitable solvent such as alcohol. The resulting subunit is ready for pressure certification of its integrity at this stage.

Fiber optic connectors 30 and 40 carry a light signal passing from a source to a detector respectively. The connectors are inserted into the cylindrical recess 14 and a recess 22 provided in an alignment plate 23. The alignment plate is mounted so that it slides back and forth on the surface of wall 12.

The alignment plate is micropositioned in place such that signal between the fibers in the connectors is maximized. This operation automatically aligns the transverse positions of the connector held by the alignment plate with the image of the lower connector assuring a minimum throughput attenuation. The alignment plate and body are temporarily bonded or tacked in place using a cyanoacrylate instant adhesive such as the type commercially marketed under the trade designation Loctite Type 495. The penetrator is removed from the alignment micropositioner fixture (not shown) and the plate is electron beam welded to the penetrator body creating an extremely strong and stable finished assembly.

The aforedescribed penetrator fabricated in accordance with the method of this inventive concept can be certified for pressure integrity as a subunit and the cables and connectors can be added as desired. Both of the connectors are fully demountable from both the high and low pressure sides of the penetrator. Full connector and fiber compatibility are achieved allowing rapid cable interchange if required. Optionally, a vapor seal of indium solder can be added to bridge the glass-and-metal interfaces if hermeticity is desired.

The high pressure side of the penetrator can be operated immersed in transparent oil or in clear grease if underwater make-and-break characteristics are to be maintained. There is no possibility of water leakage even when the connectors are removed from the penetrator. Since the penetrator is straightforward to manufacture, it is reproducible when the above fabrication techniques are followed.

Although a one-half pitch SELFOC has been described, if a rod slightly less than one-half pitch is selected, a setback tolerance between the Selfoc lens end faces and the connectors is automatically introduced to reduce the possibility of fiber or rod scratching by entrapped grit. Optionally, the penetrator disclosed can employ a transparent index matching oil, for example, mineral oil, at both interfaces between the cylindrically-shaped lens and the fiber optic connectors and it can double as a pressure compensating fluid at the high pressure side of the penetrator. Because the Selfoc rod lense is a coherent imaging device, it is possible to image multiple fiber channels through the same rod if satisfactory fiber alignment techniques are followed.

Obviously, many other modifications and variations of the present invention are possible in the light of the above teachings. It is therefore to be understood that within the scope of the disclosed inventive concept the invention may be practiced otherwise than as specifically described.

What is claimed is:

1. A method for making a penetrator capable of optically transmitting through a wall separating a first medium from a higher pressure medium comprising:
   providing a bore through the wall having a first side and a second opposite side;
   applying wax to one end of a cylindrically-shaped lens;
   inserting the cylindrically-shaped lens into the bore, the lens having a length to locate its far end flush with the first side of the wall and the wax applied end within the bore at the second opposite side of the wall;
   melting the wax allowing it to flow around the top of the wax applied end of the cylindrically-shaped lens to hold the lens in place;
   cooling the melted wax to precisely fix the cylindrically-shaped lens into position wthin the bore and defining a clearance space between the cylindrically-shaped lens and the bore;
   potting high strength epoxy resin in the clearance space between the cylindrically-shaped lens and the bore by vacuum drawing resin into the clearance space to assure a uniform bonding of the lens in the bore;
   curing the resin retained in the clearance space to secure the lens in a water-tight and gas-tight sealed relationship; and
   aligning optical fibers on either side of the lens to assure optical signal transfer, the step of alignment includes there being a moveable plate to align the fibers with the lens and the tacking of the plate in place with cyanoacrylate adhesive thereby not disrupting the integrity of the penetrator lens.

2. A method according to claim 1 further including:
   resting the wall and cylindrically-shaped lens on a surface plate to automatically index the far end flush with the first side of the wall to allow the step of inserting of the lens flush.

3. A method according to claim 2 in which the steps of providing, resting and inserting involve the selecting of a wall with the proper thickness so that the far end of the cylindrically-shaped rod can be automatically indexed flush with the first side of the wall.

4. A method according to claim 3 in which the step of melting includes the placing of a heat conductive tool against the applied wax end of the rod and heating the conductive tool to melt the wax, the wax not flowing into the clearance space.

5. A method according to claim 4 further including:
   ultrasonically cleaning the melted wax away with a solvent after the step of curing and prior to the step of aligning.

6. A method according to claim 5 in which the cylindrically-shaped lens is a one-half pitch graded refractive index lens.

7. A method according to claim 6 in which the step of alignment includes the electron beam welding of the cyanoacrylate tacked alignment plate in place.

* * * * *